(12) United States Patent
Koga et al.

(10) Patent No.: US 7,779,416 B2
(45) Date of Patent: Aug. 17, 2010

(54) LOAD BALANCE CONTROL METHOD AND LOAD BALANCE CONTROL APPARATUS IN DATA-PROCESSING SYSTEM

(75) Inventors: Kentaro Koga, Fujisawa (JP); Akinori Inoue, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 1576 days.

(21) Appl. No.: 10/917,267

(22) Filed: Aug. 11, 2004

(65) Prior Publication Data
US 2005/0081211 A1  Apr. 14, 2005

(30) Foreign Application Priority Data
Aug. 11, 2003 (JP) ............................... 2003-207002

(51) Int. Cl.
*G06F 9/46* (2006.01)
(52) U.S. Cl. ..................................... 718/105
(58) Field of Classification Search ................... 718/105
See application file for complete search history.

(56) References Cited

U.S. PATENT DOCUMENTS

| | | | |
|---|---|---|---|
| 5,774,660 A | | 6/1998 | Brendel et al. |
| 5,828,843 A | * | 10/1998 | Grimm et al. ............... 709/228 |
| 6,138,159 A | | 10/2000 | Phaal |
| 6,314,463 B1 | * | 11/2001 | Abbott et al. ............... 709/224 |
| 7,152,102 B2 | * | 12/2006 | Brinton et al. .............. 709/223 |

FOREIGN PATENT DOCUMENTS

JP  09-167141 A  6/1997

* cited by examiner

*Primary Examiner*—Meng-Ai An
*Assistant Examiner*—Mengyao Zhe
(74) *Attorney, Agent, or Firm*—Townsend and Townsend and Crew LLP

(57) ABSTRACT

A load balancing method for processing a plurality of job requests from a plurality of clients includes receiving a first request from one of the clients at a load control module. The first request relates to performing a first function by one or more of a plurality of application servers that are coupled to the plurality of clients. The first request received is associated to one of a plurality of job categories that each of the servers is configured to perform, the one job category to which the first request is associated being a first job category. Whether or not a first condition associated with the first job category is satisfied is determined. The first request is sent to a load balancer if the first condition associated with the first job category is determined to be satisfied, so that the load balancer can assign the first request to one of the application server in order to perform the requested first function, wherein the load balancer is coupled to the servers and configured to balance loads of the servers by distributing requests to the servers. At the load control module first information from the load balancer, the first information relating to the time expended in processing the first request is received. The load control module uses second information relating to the first information to determine whether to send a second request received from one of the clients to the load balancer or to a queue, the second request relating to the same job category as the first request.

14 Claims, 5 Drawing Sheets

FIG.2
Request Information DB Table

| URL Pass Name | Job Name | Number of Requests Being Executed | Average Response Time for Each URL |
|---|---|---|---|
| /gyoumuA/executeQuery.jsp | Job A | 4 | 1.9 |
| /gyoumuA/regist.jsp | Job A | 6 | 1.57 |
| /gyoumuB/getList.jsp | Job B | 7 | 0.28 |
| /gyoumuB/searchName.jsp | Job B | 9 | 0.44 |
| /gyoumuC/sendMail.jsp | Job C | 5 | 1.21 |
| /gyoumuC/comfirm.jsp | Job C | 7 | 0.8 |
| : | : | : | : |

FIG.3
Restriction Information DB Table

| Job Name | Maximum Number of Request Number | Total Number of Requests | Maximum Response Time | Average Response Time for Each Job |
|---|---|---|---|---|
| Job A | 12 | 10 | 2.00 | 1.70 |
| Job B | 29 | 16 | 1.00 | 0.37 |
| Job C | 18 | 12 | 2.00 | 0.97 |
| : | : | : | : | : |

LOAD BALANCE CONTROL METHOD AND LOAD BALANCE CONTROL APPARATUS IN DATA-PROCESSING SYSTEM

CROSS-REFERENCES TO RELATED APPLICATIONS

This application claims priority to Japanese Patent Application No. 2003-207002, filed on Aug. 11, 2003.

BACKGROUND OF THE INVENTION

The present invention relates to a load control method for controlling load balance of respective resources in a data processing system having a plurality of resources.

Conventional load distribution control methods, as disclosed in JP Application No. 9-167141, U.S. Pat. Nos. 5,774, 660, and 6,138,159, perform load distribution according to use conditions of the resources for each job, e.g., such as batch, on-line and TSS (time sharing system) executed in a computer system. The load is balanced according to the types of job requests, i.e., based on whether or not a request is a batch request, a TSS request, or on-line request.

Accordingly, the conventional load distribution control methods are realized according to the use modes of computer systems. When the use modes of computer systems are identical (for example, in on-line mode), however, such a load balance method suffers from a problem that the load distribution controls are uniformly applied regardless of the process contents. For example, a round robin method is used to balance the load if the use mode is the same. Under such a method, the requests are treated the same way even though some requests require more time to process than other requests.

BRIEF SUMMARY OF THE INVENTION

One feature of the present invention is to control load distribution in accordance with the of resource groups to which the requests need to access.

Another feature of the invention is to prevent a large backup of jobs (or "light load jobs") that may otherwise be performed quickly due to having jobs ("heavy load jobs") that require long time to access a shared DB.

One embodiment of the invention is directed to a method for controlling loads being applied on the shared DB for each job by previously determining jobs requested by a request transmitted from a client and setting a maximum number of process time for each job type. The request is associated with a given job type by examining the Universal Resource Locator (URL) of the request.

Another embodiment of the invention is directed to a load control program for controlling loads applied on the shared DB, which comprises recording a number of requests for high-load jobs from clients for each URL; determining the requested jobs from the URL; comparing a number of jobs being executed and a threshold number of jobs and temporarily putting the request in a queue if the number of jobs being executed equals or exceeds the threshold number of jobs; transmitting the request to a job processing apparatus when a job execution condition is met; and calculating an average execution time of job based on a response from the job processing apparatus.

In one embodiment, a load balancing method for processing a plurality of job requests from a plurality of clients includes receiving a first request from one of the clients at a load control module. The first request relates to performing a first function by one or more of a plurality of application servers that are coupled to the plurality of clients. The first request received is associated to one of a plurality of job categories that each of the servers is configured to perform, the one job category to which the first request is associated being a first job category. Whether or not a first condition associated with the first job category is satisfied is determined. The first request is sent to a load balancer if the first condition associated with the first job category is determined to be satisfied, so that the load balancer can assign the first request to one of the application server in order to perform the requested first function, wherein the load balancer is coupled to the servers and configured to balance loads of the servers by distributing requests to the servers. At the load control module first information from the load balancer, the first information relating to the time expended in processing the first request is received. The load control module uses second information relating to the first information to determine whether to send a second request received from one of the clients to the load balancer or to a queue, the second request relating to the same job category as the first request.

In another embodiment, a load control apparatus for processing a plurality of job requests from a plurality of clients includes means for receiving a first request from one of the clients at a load control apparatus, the first request relating to performing a first function by one or more of a plurality of application servers that are coupled to the plurality of clients; means for associating the first request received to one of a plurality of job categories that each of the servers is configured to perform, the one job category to which the first request is associated being a first job category; means for determining whether or not a first condition associated with the first job category is satisfied; means for sending the first request to a load balancer if the first condition associated with the first job category is determined to be satisfied, so that the load balancer can assign the first request to one of the application server in order to perform the requested first function, wherein the load balancer is coupled to the servers and configured to balance loads of the servers by distributing requests to the servers; and means for receiving at the load control module first information from the load balancer, the first information relating to the time expended in processing the first request, wherein the load control module uses second information relating to the first information to determine whether to send a second request received at the load control module to the load balancer or to a queue, the second request relating to the same job category as the first request.

In yet another embodiment, a load controlling device provided in a data processing system, the data processing system including a plurality of clients and a plurality of servers, comprises a request registration component to receive a first request from one of the clients, the first request relating to performing a first function by one or more of a plurality of application servers that are coupled to the plurality of clients, the request registration part being configured to associate the first request received to one of a plurality of job categories that each of the servers is configured to perform, the one job category to which the first request is associated being a first job category; a load restriction component to determine whether or not a first condition associated with the first job category is satisfied, the load restriction component being configured to send the first request to a load balancer if the first condition associated with the first job category is determined to be satisfied, so that the load balancer can assign the first request to one of the application server in order to perform the requested first function, wherein the load balancer is coupled to the servers and configured to balance loads of the servers by distributing requests to the servers; and a process result registration component to receive first information from the load balancer, the first information relating to the time expended in executing the first request, wherein the load control device uses second information relating to the first information to determine whether to send a second request received from one of the clients to the load balancer or to a queue, the second request relating to the same job category as the first request.

BRIEF DESCRIPTION OF THE DRAWINGS

FIG. 2 shows a request information database (DB) table according to one embodiment of the present invention.

FIG. 3 shows a restriction information DB table according to one embodiment of the present invention.

DETAILED DESCRIPTION OF THE INVENTION

Figure 1:
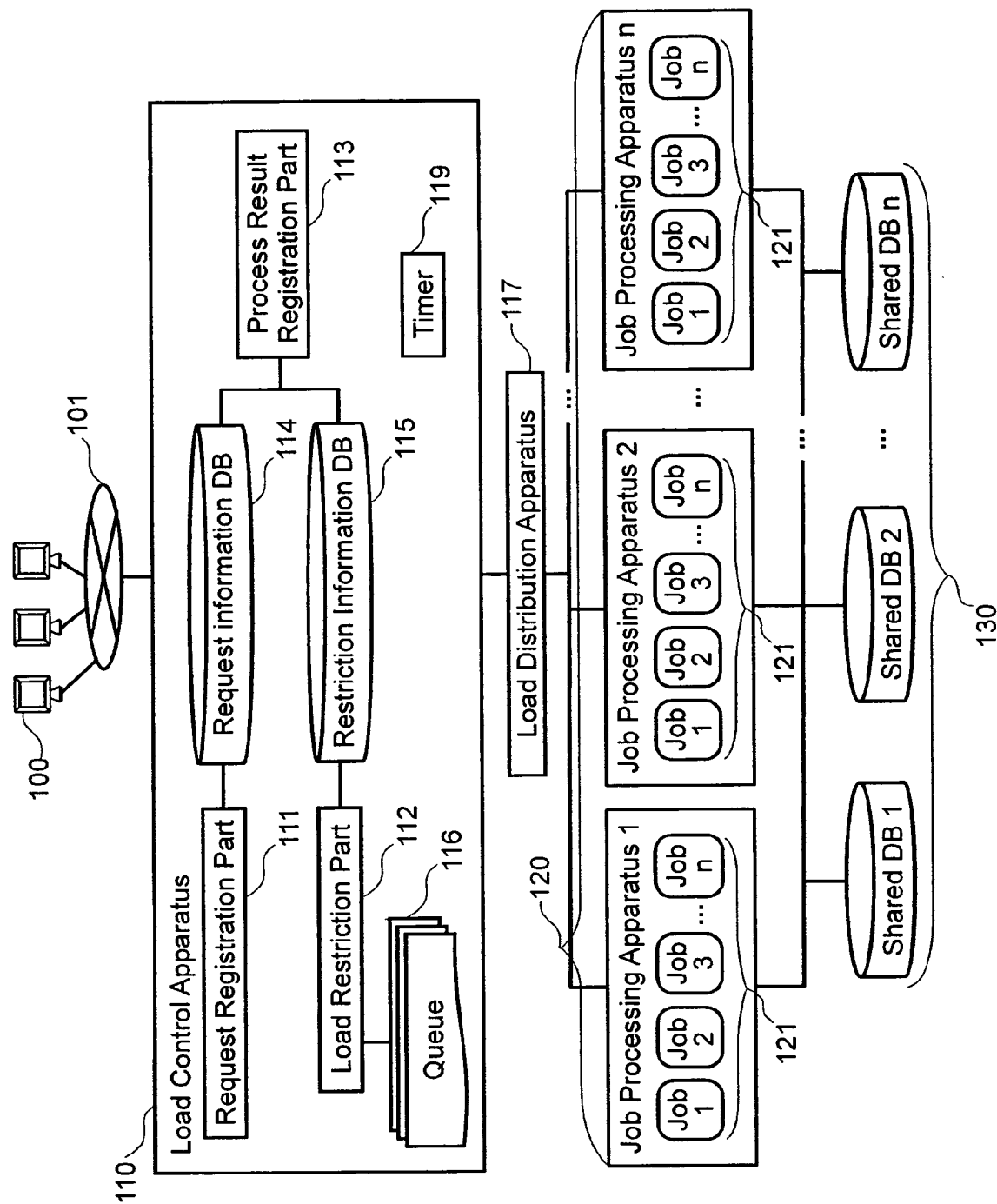
FIG. 1 shows a schematic diagram showing a data processing system according to one embodiment of the present invention.

FIG. 1 is a schematic diagram illustrating a data processing system according to one embodiment of the present invention. A plurality of clients 100 are coupled to a network 101 to request job processing by sending requests to application servers, e.g., job-processing apparatuses. The clients 100 are connected to a load control apparatus 110 via the network 101. The load control apparatus 110 includes a request registration part 111, a load restriction part 112, a process result registration part 113, a request information DB 114, a restriction information DB 115, a wait queue 116, and a timer 119.

A load distribution apparatus 117 (or load balancer) distributes requests to a job processing apparatus group 120 including a plurality of job processing apparatuses. In the present embodiment, the load distribution apparatus and load control apparatus are provided as two distinct devices. However, these may be integrated as a single network device. For example, the load control apparatus may be a module provided within the load distribution apparatus. The module may be in the form of hardware or software.

A job unit 121 comprising a plurality of jobs is processed by the job processing apparatus group 120. In one implementation, a plurality of jobs 121 are processed within a single job processing apparatus, i.e., the group 120 is a single server. In another implementation, a plurality of shared DBs 130 are used by the respective job processing apparatus or server. When a job process request is provided through a browser of the client 100, the request is first input into the request registration part 111 of the load control apparatus 110. The request control part 111 updates the request information DB 114 according to contents of the request received, e.g., by examining the URL of the request.

The request information DB has a table 200 as shown in FIG. 2. URL pass names 201 are used for processing the DBs. For example, a pass name is assigned to a given URL. A job name 202 exists inside the job processing apparatus 120. The job name identifies a given type or category of job processing. For example, the first two URLs in the table are defined as "Job A," so that any job requests received for these URLs would be categorized as requests for Job A or Category A. A number 203 of requests being executed shows the number of job requests being executed in the job processing apparatus 120 for each of the URLs listed in the URL pass name 201. That is, the number 203 indicates a number of requests currently being executed for each job type by the job processing group 120. One or more job types comprise a job name or category. An average response time 204 shows an average time required to execute a given request, e.g., from starting of processing of the URL to the completion. For example, in FIG. 2, a job request for the first URL on the table 200 requires an average of 1.9 second to execute.

Figure 4:
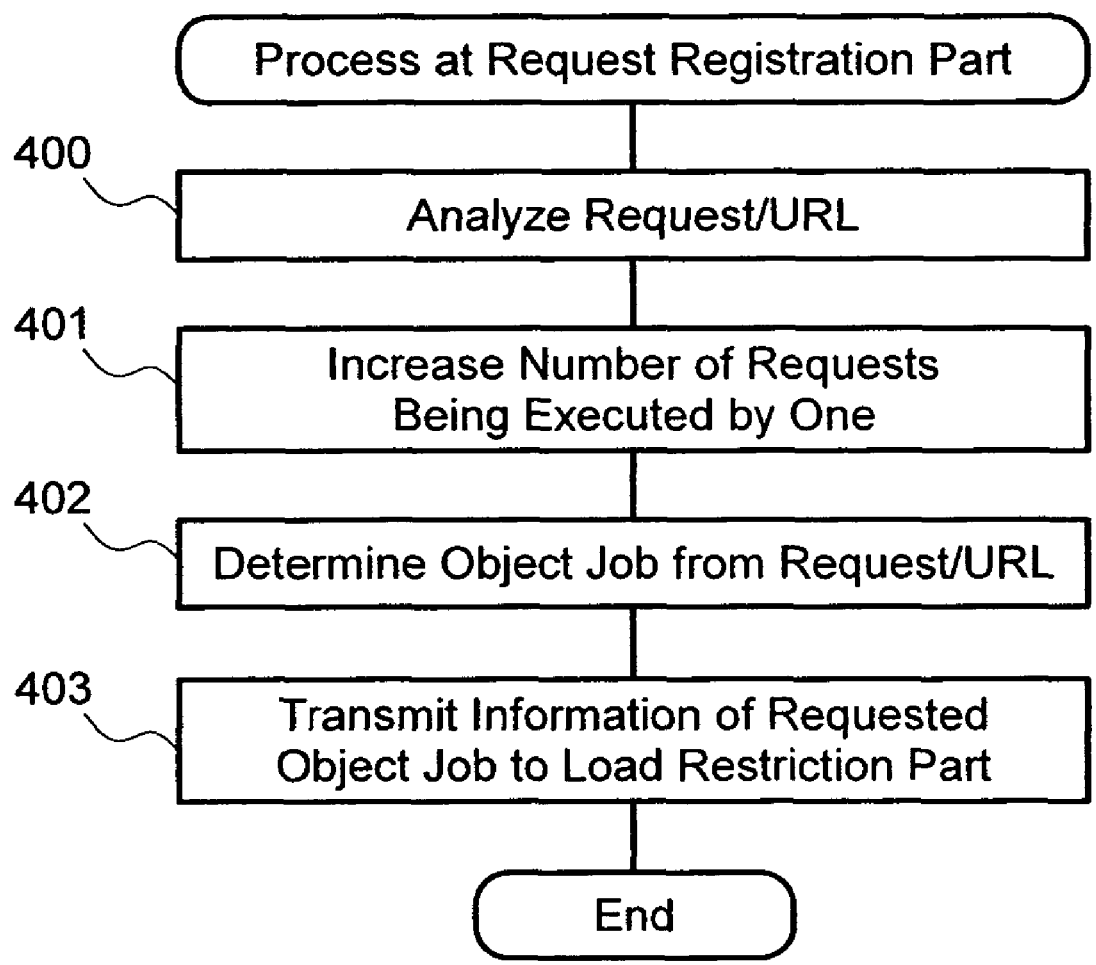
FIG. 4 shows a process associated with a request registration part according to one embodiment of the present invention.

FIG. 4 illustrates a process associated with the request registration part 111 according to one embodiment of the present invention. When the request is received at the load control apparatus 110, the apparatus examines the URL specified by the request (Step 400). After that, the apparatus accesses the request information DB and increases by the number 203 of requests being executed for the URL specified by the request (Step 401). The apparatus attaches the job name 202 to the request URL (Step 402) and delivers the request and job name to the load restriction part 112 (Step 403). The load restriction part 112 processes the request received based on a number of requests currently being executed for such a job category and loads being applied on the shared DB 130, as explained below.

FIG. 3 shows a table 300 in the restriction information DB 115 according to one embodiment of the present invention. A number 301 indicates a job name or job category, and a number 302 indicates a maximum number of requests that may be executed currently for a given job name or category. In one implementation, this maximum or threshold number is predefined by an administrator. In another implementation, the number is set by a management program.

The table also includes a total number of requests 303 indicating a total number of requests being executed in the job processing apparatus group 120 for a given job name or category. The total number 303 is based on the number of requests 203, i.e., by summing the corresponding numbers 203. For example, the job types belonging to the same job names are summed to obtain the total number 303.

A maximum response time 304 indicates the maximum delay allowed for executing a request of given category or job name. An average response time 305 indicates time required to execute a given request. For example, the average response time 305 indicates that a request for Job A requires on average of 1.70 second to execute. The maximum number 302 and maximum time 304 are conditions that the load control apparatus uses to determine whether to transmit a request to the load distribution apparatus 117 or the queue 116. In one implementation, only one of the above two condition is used.

Figure 5:
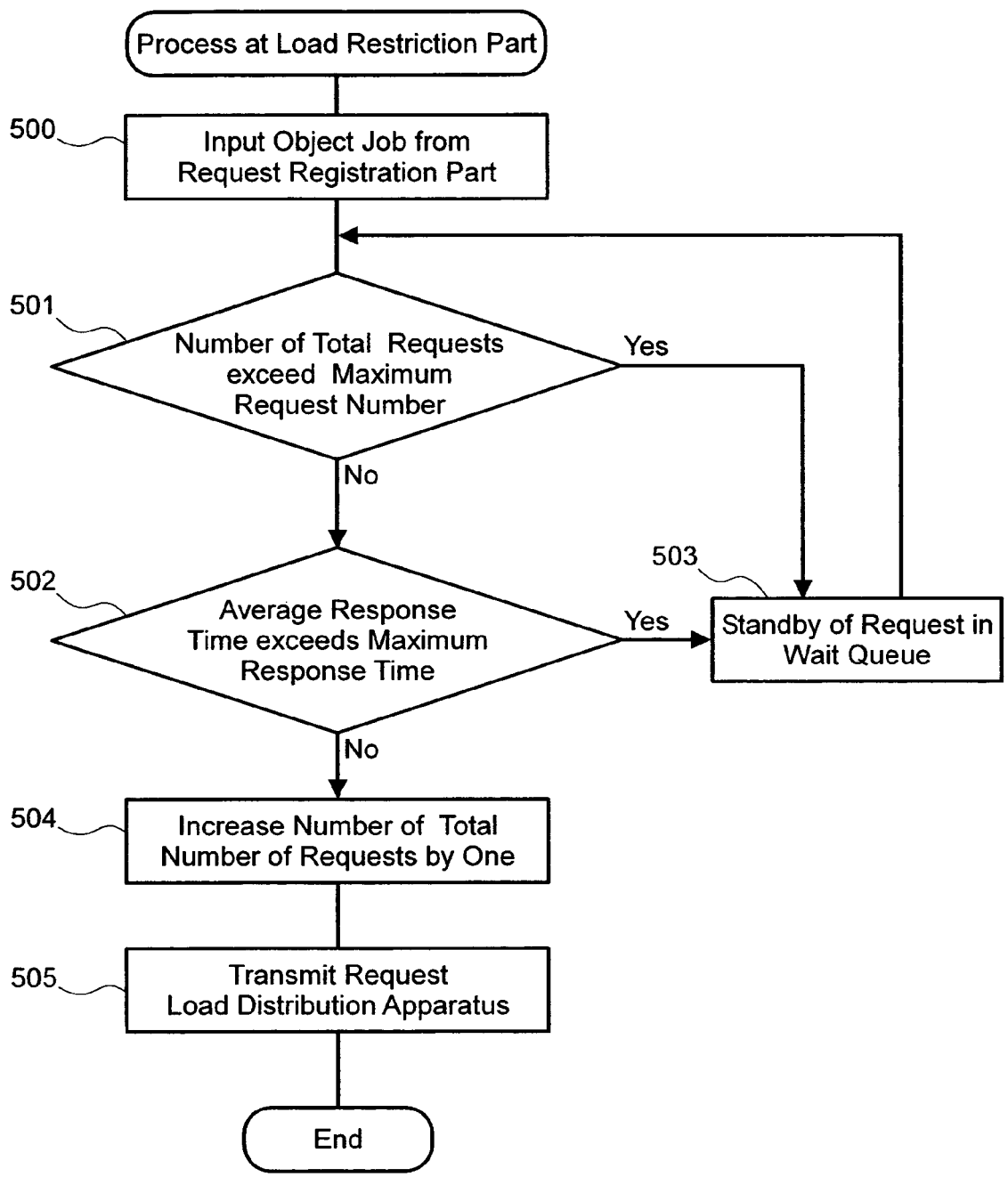
FIG. 5 shows a process associated with a load restriction part according to one embodiment of the present invention.

FIG. 5 illustrates a process associated with the load restriction part 112 according to one embodiment of the present invention. When the object job (or job name or category) is input from the request registration part 111 (Step 500), the total number 303 of requests currently being executed in the job processing apparatus group 120 for that job category is compared to the maximum number 302 (Step 501). If the total number 303 equals or exceeds the maximum number 302, the request received from the request registration part 111 is temporarily stored in the queue 116 to be processed after the number 303 has decreased below the number 302 (Step 503).

Otherwise, the next condition is tested at step 502. At step 502, it is determined whether or not the average response time 305 equals or exceeds the maximum response time 304. If so, the request received is stored in the queue 116 to be processed after the average response time 305 has decreased below the maximum response time 304. If not, the value of the total number of requests 303 is incremented by one (Step 504), and request is transmitted to the load distribution apparatus 117 (Step 505).

The load distribution apparatus 117 then transmits the request to the job processing apparatus group 120 in a uniform manner, e.g., in a round robin method. The job processing apparatus 120 executes the a job 121 corresponding to the request by accessing the shared DB 130, if necessary. The process result is returned to the client 100.

The job processing apparatus group 120 also sends a notification once the request has been executed to the process result registration part 113 of the load control apparatus 110. The process result registration part 113 calculates the time period expended to execute the request using the timer 119. The timer 119 is started for the request when it was first received from the client and then stopped when the job completion notification (or job results) is received from the job processing apparatus. Alternatively, the timer 119 may be started when the request is transmitted to the load distribution apparatus 117 and stopped when the completion notification or job results is received from the load distribution apparatus 117.

Figure 6:
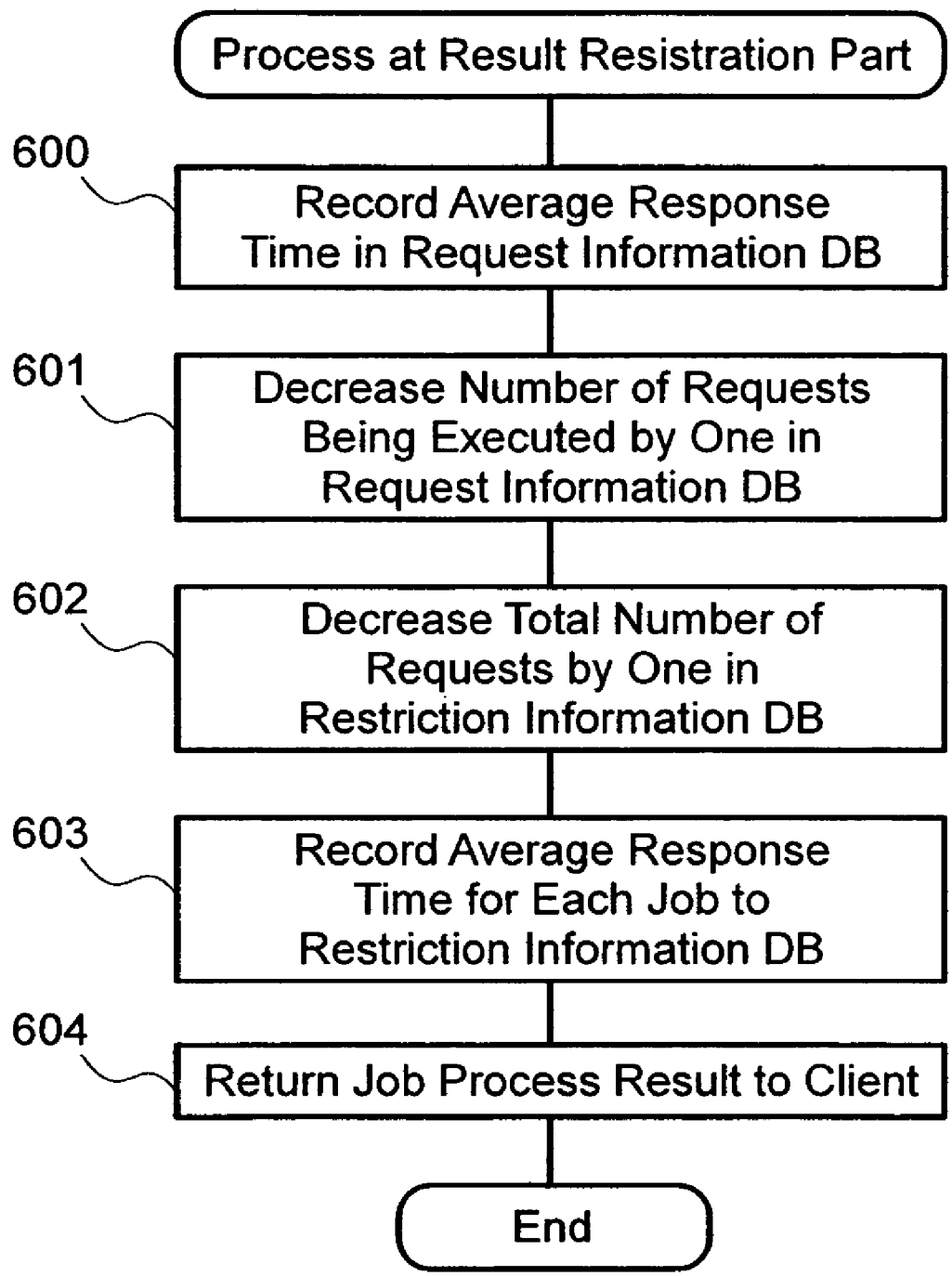
FIG. 6 shows a process associated with a process result registration part according to one embodiment of the present invention.

FIG. 6 illustrates a process associated with the process result registration part 113 according to one embodiment of the present invention. The average response time 204 for the request is updated based on the time period calculated by the timer 119 (Step 600). Step 502 associated with the load restriction part uses this updated average response time to process the next request on the same job category. The number 203 of requests currently being executed, which corresponds to the request executed, is decremented by one (Step 601). Similarly, the total number 303 corresponding to the executed request is decremented by one (Step 602). The corresponding average response time 305 is calculated and updated (Step 603). Thereafter, the job process result is returned to the client (Step 604). Alternatively, the job process result may be returned to the client first and the steps 600-604 may be performed thereafter or in parallel to any of these steps.

As described above, by temporarily restricting requests flowing into the job processing apparatus and the shared DB for each job (e.g., regulating the requests from the clients prior to transmitting them to the load distribution apparatus 117), the load on the job processing apparatus and the shared DB resulting from "heavy-load" jobs can be reduced and improve the response time for "light-load" jobs. That is, the job requests are regulated according to predefined job categories, so that jobs requiring heavy processing (or heavy load) can be regulated differently than the jobs requiring light processing, so that the "heavy-load" jobs do not create bottlenecks for the "light-load" jobs. For this purpose, in the present embodiment, the jobs are categorized according to the URLs to which they are associated.

The present invention has been described in terms of specific embodiments. These embodiments may be modified, amended, or altered without departing from the scope of the present invention. Accordingly, the scope of the present invention is defined using the appended claims.

What is claimed is:

1. A load balancing method for processing a plurality of job requests from a plurality of clients, the method comprising:
receiving a first request from one of the clients at a load control module, the first request relating to performing a first function by one or more of a plurality of application servers that are coupled to the plurality of clients, the first request having an address being comprised of at least a first job category that one or more of the application servers is configured to perform and a second job category belonging hierarchically to the first job category, wherein the first request is associated with the first category based on an address of the first function indicated in the first request and wherein the first job category includes a first and second job types, the first job type relating to a batch process, the second job type relating to an on-line process;

analyzing the address included in the first request based on the first job category and updating a number of a current processes relating to the first job category stored in a request information table, wherein the request information table stores information associated with a number of current processes of a plurality of the first job categories at the one or more application servers and a threshold value corresponding to each of the plurality of first job categories;

determining whether to send the first request to a load balancer or to a waiting queue by determining whether the number of current processes relating to the first job category is below the corresponding threshold value;

sending the first request to the load balancer in the event that the number of current processes is below the threshold value so that the load balancer can assign the first request to one of the application servers in order to perform the requested first function, wherein the load balancer is coupled to the application servers and configured to balance loads of the application servers by distributing requests to the application servers;

sending the first request to the waiting queue in the event that the number of current processes is above the threshold value, wherein the first request is sent to the waiting queue until the number of current processes is below the threshold value; and receiving at the load control module a processing result from the load balancer and updating the number of current processes, wherein the load control module determines whether to send a second request received from one of the clients to the load balancer or to the waiting queue, the second request relating to the same job category as the first request.

2. The load balancing method of claim 1, wherein the processing result relates to the time expended in executing the first request, wherein the load control module determines whether to send the second request based on an average time expended in executing requests relating to the first job category, the average time being derived using the processing result.

3. The method of claim 1, wherein the address of the first function is a Universal Resource Locator (URL).

4. The method of claim 1, wherein the first request is not sent to the load balancer in the event that an average time for processing requests relating to the first job category is determined to be longer than a predefined time period.

5. The method of claim 1, wherein the load control module updates the request information table upon receiving the first request, the request information table including information on an average time needed to complete the execution of requests relating to the first job category.

6. The method of claim 5, wherein the load control module accesses a restriction information table to determine whether to send the first request to a the load balancer or to the waiting queue, the restriction information table includes a maximum number of requests that may be executed concurrently for requests relating to the first job category and a maximum delay time allowed for executing a request relating to the first job category.

7. The method of claim 1, wherein the load control module is a load control apparatus that is remotely located from the load balancer.

8. The method of claim 1, wherein the load control module and the load balancer are provided within the same housing.

9. The method of claim 1, wherein the second request relates to performing a second function by one or more of the plurality of application servers, wherein the first function requested by the first request relates to a batch process and the second function requested by the second request relates to an on-line process.

10. A load controlling device provided in a data processing system, the data processing system including a plurality of clients and a plurality of application servers, the load controlling device comprising a plurality of computer-executable components that when executed by a processor cause the load controlling device to balance a load in the data processing system, the load controlling device comprising:
a memory;
a request registration component to receive a first request from one of the clients, the first request relating to performing a first function by one or more of the application servers that are coupled to the plurality of clients, the first request having an address being comprised of at least a first job category that one or more of the application servers is configured to perform and a second job category belonging hierarchically to the first job category, wherein the first request is associated with the first category based on an address of the first function indicated in the first request and wherein the first job category includes a first and second job types, the first job type relating to a batch process, the second job type relating to an on-line process and wherein the request registration component is configured to analyze the address included in the first request based on the first job category and to update a number of a current processes relating to the first job category stored in a request information table, the request information table storing information associated with a number of current processes of a plurality of the first job categories at the one or more application servers and a threshold value corresponding to each of the plurality of first job categories;
a load restriction component to determine whether to send the first request to a load balancer or to a waiting queue by determining whether the number of current processes relating to the first job category is below the corresponding threshold value, the load restriction component being configured to send the first request to the load balancer in the event that the number of current processes is below the threshold value so that the load balancer can assign the first request to one of the application servers in order to perform the requested first function, the load restriction component being configured to send the first request to the waiting queue in the event that the number of current processes is above the threshold value, wherein the first request is sent to the waiting queue until the number of current processes is below the threshold value, wherein the load balancer is coupled to the application servers and configured to balance loads of the application servers by distributing requests to the application servers; and
a process result registration component to receive a processing result from the load balancer and to update the number of current processes,
wherein the load controlling device determines whether to send a second request received from one of the clients to the load balancer or to the waiting queue, the second request relating to the same job category as the first request.

11. The load controlling device of claim 10, wherein the load balancer couples the load control device to the plurality of servers.

12. The load controlling device of claim 10, wherein the load controlling device and the load balancer are integrated as a single network device.

13. The load controlling device of claim 10, wherein the processing result relates to the time expended in executing the first request, wherein the load control module determines whether to send the second request based on an average time expended in executing requests relating to the first job category, the average time being derived using the processing result.

14. The load controlling device of claim 10, wherein the address of the first function is a Universal Resource Locator (URL).

* * * * *